Oct. 17, 1967 J. H. LEMELSON 3,346,894
APPARATUS FOR CONTROLLING ROTARY AND LONGITUDINAL MOVEMENT OF
A COMBINED TOOL CARRYING SPINDLE
Filed Aug. 23, 1965 2 Sheets-Sheet 1

*INVENTOR.*
Jerome H. Lemelson

United States Patent Office 3,346,894
Patented Oct. 17, 1967

3,346,894
APPARATUS FOR CONTROLLING ROTARY AND LONGITUDINAL MOVEMENTS OF A COMBINED TOOL CARRYING SPINDLE
Jerome H. Lemelson, 85 Rector St., Metuchen, N.J. 08840
Filed Aug. 23, 1965, Ser. No. 481,653
12 Claims. (Cl. 10—128)

This invention relates to tools for performing plural operations on a workpiece and is a continuation-in-part of my copending application Ser. No. 276,621 filed Apr. 29, 1963, and now U.S. Patent 3,227,017 entitled Combination Tools having as a parent application Ser. No. 477,467 which was filed on Dec. 24, 1954 and is now abandoned.

It is a primary object of this invention to provide new and improved combination tools applicable for performing a plurality of operations on a workpiece during a single stroke or movement of the tool through the workpiece.

Another object is to provide a combinational tool including a drill having a further portion for performing a secondary operation on a workpiece during or immediately following the cutting of a hole in the workpiece by said drill.

Another object is to provide an automatic tool apparatus including a cutting tool comprising a drill portion and a secondary cutting portion situated beyond said drill portion for providing a secondary cutting operation on the work machined by the drill portion, said apparatus including means for controllably rotating said cutting tool and controlling its longitudinal movement to cause coaction of the drill and the secondary cutting portion in shaping the work.

Another object is to provide an improved automatic tool including a cutter having a plurality of operating portions certain of which cut during the rotation of the tool while others operate during the longitudinal movement of the tool and including means for controllably rotating and longitudinally moving the tool.

Another object is to provide an apparatus for mounting a combination tool capable of performing operations on a workpiece while rotating and longitudinally moving, and variable program control means for said apparatus for predeterminedly rotating and longitudinally moving said tool in a cycle to effect combinations of operations on said workpiece by said tool without the need for special adjustments to vary the cycle.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 7:
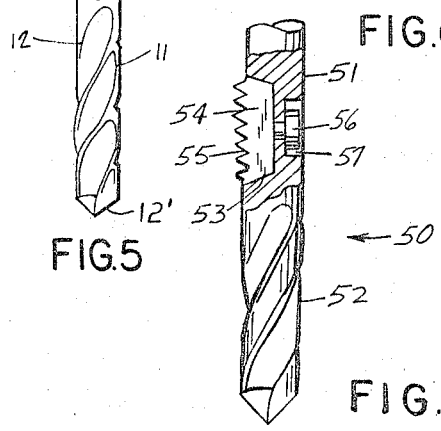
FIG. 7 is a side view of a drill including means for also punching holes in a workpiece adjacent the drill hole.
Figure 7:
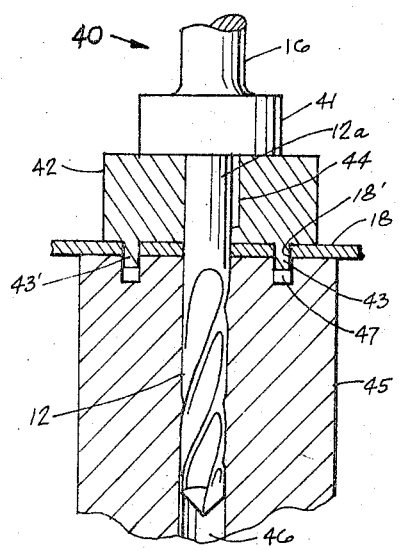
Figure 8:
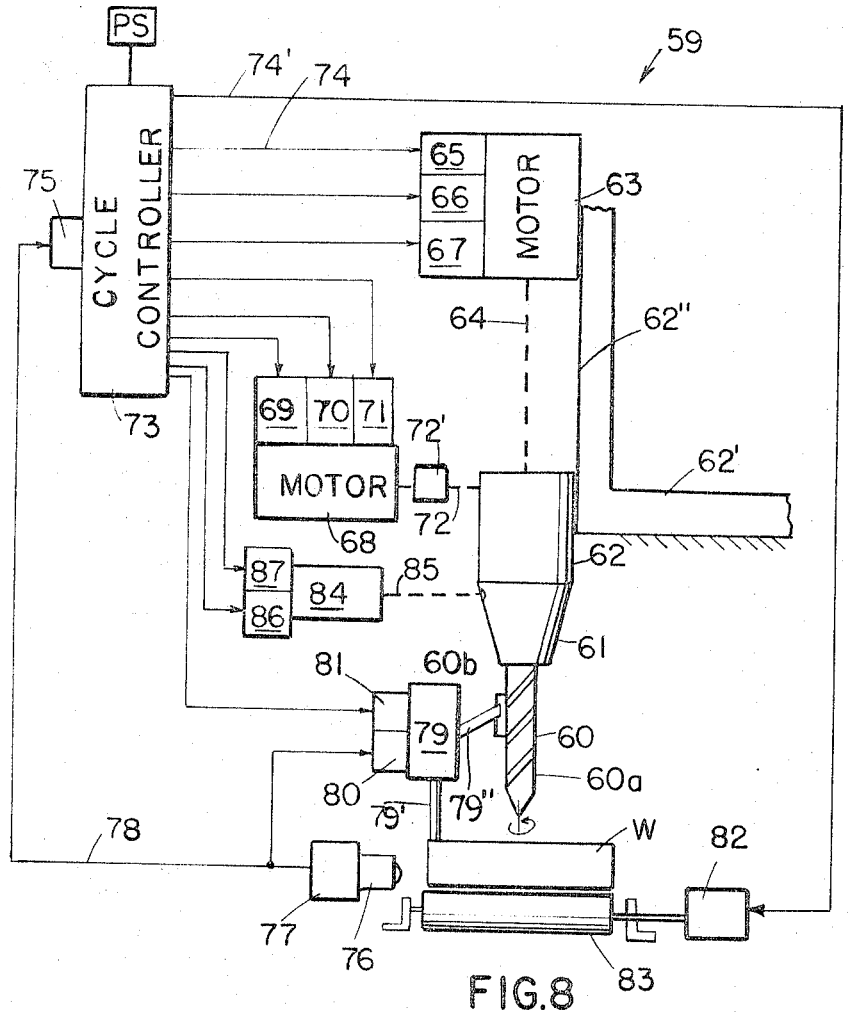
Figure 9:
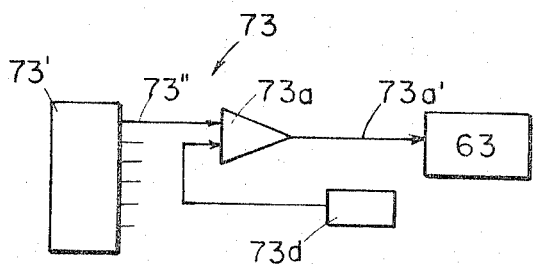

FIG. 7' shows a combination tool 50 having a shank 51 fluted at the lower end to define a conventional drill portion 52 operative to drill a hole in or through a workpiece as the tool rotates and is advanced into said workpiece;

FIG. 8 is a schematic diagram of apparatus for automatically controlling tools of the type provided in FIGS. 1–7; and FIG. 9 is a schematic of a summing amplifier control arrangement for the servo-motor.

Figure 1:
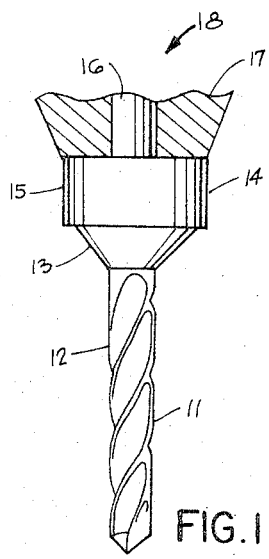
FIG. 1 is a side view of a combination tool including a drill which is also adapted to effect a pressing operation.
Figure 2:
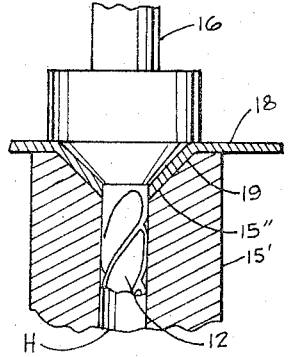
FIG. 2 is a side view with parts broken away for clarity of the tool of FIG. 1 as it operates to deform a sheet of metal following drilling a hole therein.

In FIGS. 1 and 2 is shown a tool which is operative to (a) drill a hole in a sheet of metal 18 and (b) immediately thereafter, and in the same stroke as that effected in drilling, to deform the sheet adjacent the drilled hole to provide a so called "dimple" or tapered cavity 19 therein for receiving the tapered head of a screw, rivet washer or bolt.

The tool 10 comprises an end-portion 12 shown in the shape of a twist drill and connected to a tapered head 13, which may be an extension of the material of its upper shank or a separate unit secured to its upper shank. The lower portion of 12 may also have any suitable shape for cutting a round hole as 10 rotates. The upper end of 13 extends to a cylindrical head 14, which is shown abutting the end of a chuck 17 of a powered drill such as an electric pneumatic or hydraulic drill press or unit, adapted for rotating and longitudinally moving the chuck 17 in a manner to effect both drilling and dimpling.

Depending on the thickness of sheet 18 and the backing required during drilling the hole therein, said sheet may originally be placed on a support having a hole H a little larger than the diameter of the drill portion 12 aligned with 12 whereafter a second block such as 15 of FIG. 2 may be aligned with 10 for both receiving the drill portion 12 and cooperating with the tapered surface of portion 13 in dimpling the sheet. In FIG. 2, the support 15 is shown with a tapered cavity 15' therein which is shaped to cooperate with 13 in dimpling the sheet. The block 15 may be used initially during the drilling operation or automatically brought into play after the hole has been drilled. While the block 15 may comprise a solid non-yielding material such as metal, it may also comprise a yieldable material such as urethane rubber which will cooperate with portion 13 of the tool 10 in forming the dimple 19 in sheet 18. Deformation of sheet 18 may be effected while the tool assembly and drill portion 12 are not in rotation whereby axial forces effect said deformation or while assembly 10 is rotating whereby the metal is spun to shape. If member 18 is a thermoplastic, frictional heat created in rotating 13 thereagainst may be employed to render 18 semi-molten and effect its deformation as shown. Notation 16 refers to an upper shank extending from 17 and retained in the jaws of the chuck 17.

Figure 3:
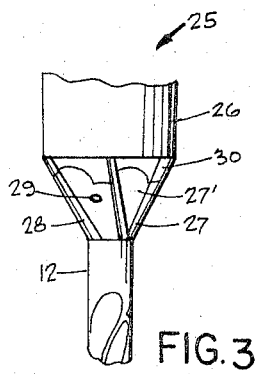
FIG. 3 is a side view of a tool similar to that of FIG. 2 having removable cutting blades.
Figure 4:
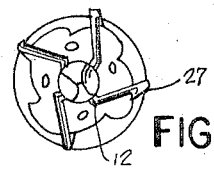
FIG. 4 is an end view of FIG. 3.

In FIGS. 3 and 4 is shown a tool 25 which comprises a drill portion 12 which is joined to a somewhat conically shaped portion 27 made of a plurality of parts which are assembled on a centrally located extension of the drill portion 12 and secured to an upper cylindrical shank 26 which is chucked or otherwise held fixed relative to a power operated device as described. The central portion 27 is provided with a plurality of replaceable blades 28 by a plurality of wedge shaped inserts 27' which are retained by screws 29 and are shaped to wedge said blades in position upon tightening of said set-screws. In other words, the inserts 27' are shaped with tapered sides to exert a greater force against the inclined or tapered side surfaces of the blades as said inserts are drawn radially inward when screws 29 are tightened.

The blades 28 are preferably made of a hard cutting material such as tungsten carbide, or the like and have a frusto-conical cross sectional shape to permit them to be wedged between adjacent inserts 27' when the screws 29 are drawn radially inward into the code holes in the central shank extension of 12. Notation 30 refers to the upper portion of the tapered section 27 which is integral with and an extension of the material of the central extension of drill 12 and the upper shank 26.

The construction and blade assembly means of the embodiment of FIGS. 3 and 4 may be applied to other similar types of cutting tools including milling cutters, reamers and the like.

For example, the assembly illustrated in FIG. 3 may be used in the construction of conventional milling cutters of any suitable shape without the application thereof to a combination drill and milling cutter as shown.

Figures 5, 6:
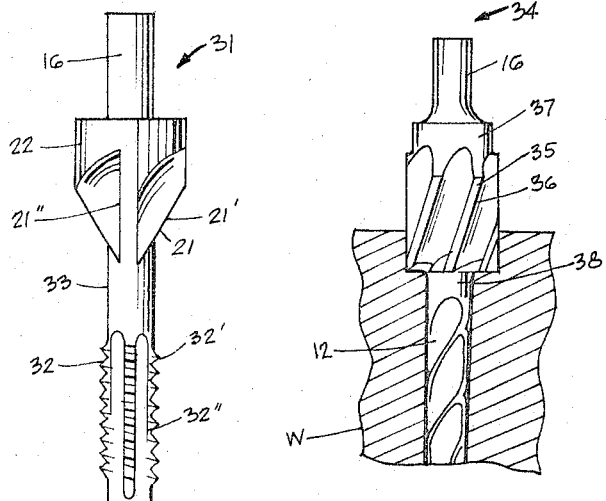
FIG. 5 is a side view of a combination drill, tap and countersinking tool.
FIG. 6 is a side view of a combinational drill and counter-boring tool.

FIG. 5 illustrates a tool applicable to a rotary and longitudinally or axially moving machine device such as an automatically controllable, motor driven drill, which tool may perform one or more of the functions of drilling a hole, tapping said hole and counter-sinking or counter-boring a portion of the hole. The exact number of functions performed by the tool will depend on the longitudinal movement thereof during the automatic operation of the machine holding said tool. The tool comprises an elongated shank 11 having a twist drill 12 at one end thereof which, as in the embodiments hereinabove described, may have any suitable shape including others than that of a twist drill for boring a hole in a workpiece. Centrally disposed along the shank 11 is a portion 32 thereof which has been machined with teeth 32' disposed along a plurality of land portions 32" which define a tap for tapping or threading the hole drilled by the drill or boring portion 12. Notation 12' refers to the tapered end of the drill which is of conventional design and is operative to initiate boring the hole and effect machining or cutting when the cutting edges thereof engage the material being drilled.

Notation 33 refers to a cylindrical portion of the shank 11 disposed beyond the tap portion 32 and having a diameter smaller than that of the threads of the tap portion. The length of portion 33 is preferably sufficient to permit the tap portion 32 to completely clear the hole in the work (i.e. extend beyond the blind-face of the work so that the conically shaped countersink portion 21 of the tool may be rotated at high speed thereafter to effect machining a portion of the wall of the hole to define means for receiving a tapered or countersunk head screw). Countersinking portion 21 is fabricated in accordance with the similar portion provided in the tool 18 of FIG. 1 and protruding upward therefrom is a cylindrical shank portion 16 which is adapted to be gripped by the jaws of the chuck of the machine or drill which is operative to rotate and longitudinally move tool 31.

If it is desired to utilize the tool of FIG. 5 merely as a drill, the machine mounting said tool and/or workpiece are moved in a manner whereby only the drill portion 12 is advanced into or through the workpiece. If it is desired to drill and tap, the drill portion 12 is rotated and advanced completely into or through the workpiece and tool 31 is continued in its advance preferably at a different speed than drilling, whereby the tap portion 32 enters the hole drilled by 12 and is operative to cut threads therein. If it is desired to countersink the hole which has been drilled and tapped by portions 12 and 32, the tool 31 is further advanced, preferably such that the tapping portion 32 completely clears the work from the blind-face thereof and the countersinking portion 21 enters the hole the desired degree to effect cleaning the walls thereof with the taper defined by said countersinking portion.

While the tool 31 may be fabricated from a single piece of tool steel or the like, it is noted that the countersinking portion 21 may be assembled with the other portions and held in place by screws, keys, or the like. Thus, portion 21 may be removed from the tool so that the drill portion 12 and tap portion 32 may be utilized per se in drilling and tapping a hole.

In FIG. 6 is shown a modified form of the embodiment illustrated in FIG. 3 comprising a tool having a milling cutter portion for counterboring a hole which has previously been drilled by a drill portion of the same tool. The unitary tool 34 comprises a drill or first milling portion 12 extending to the counterboring mill 36 which is preferably formed as an integral formation of the same shank material of which the drill is made or may be assemblable therewith and an upper shank 16 adapted to be retained in a chuck of the machine used to rotate and axially move the tool. The milling cutter portion 35 is of conventional design having a plurality of cutting lands 36 formed in the cylindrical shank 37 which terminate at their lower end in a plurality of milling cutting edges 38 which are effective in counterboring the hole drilled by portion 12 in the work W. The milling portion 35 may also be utilized to replace the countersinking portion 21 of FIG. 5.

In FIG. 7 is illustrated a tool, 40 which is operative to drill a hole through one or more workpieces such as the sheet 18 and, upon completion of the drilling operation, to punch a plurality of additional holes therein in predetermined relationship to the drilled hole. The sheet 18, for example, may require three poles for securing a so-called anchor nut in place. The center hole which is drilled by the drill portion of tool 40 is used to align with the nut of the device while two additional holes are provided by punching to receive portions of the retainer for the anchor nut or small rivets adapted to secure said retainer in a predetermined position relative to the drilled hole. Accordingly, a punching die 42 is provided as a block secured to the upper shank portion 12a of the shank of the drill and is retained against the upper shelf 41 which is integral with 12a by means of a key 44, screw or the like extending between holes in the block 42 and shank 12a. Thus the tool 40 may be rotated by the machine in which it is chucked at the correct speed to cause the drill 12 to cut a hole in a key after which, it may be longitudinally moved at sufficient force to effect die-punching of additional holes in the work. Notations 43 and 43' refer to portions of the die block 42 which define cutting surfaces for punching said holes in the work 18 in cooperation with a second die block 45 aligned with 42, which die block is also provided with a hole 46 for receiving the drill 12.

If the block 45 is made of a resilient material such as urethane rubber, it is possible to form or punch one or more holes in a thin sheet of metal such as 18 by restraining the block 45 from lateral deformation by holding it in a form. Otherwise, the block 45 may be provided with one or more cavities 47 which cooperate with the cutting projections 43 of the die block 42 in effecting punching said holes. Thus, in order to operate the tool 40 to effect the combined operations of drilling followed thereafter by punching or forming in a single stroke, it will be necessary to index or align the tool relative to the block 45 which function may be automatically controlled by automatically controlling the machine and longitudinally moving said tool. Various means are known in the art for controlling rotation and longitudinal movement of a tool as well as angular position thereof in accordance with a programmed input or by known indexing means and may be applicable to the tool arrangement 40 of FIG. 7.

It is noted that the embodiment illustrated in FIG. 7 may comprise a number of variations applicable for providing a combination drill and punch or circular cutting tool. For example, the punch portion 42 may be operative to both deform and punch one or more holes in sheet 18 subsequent to drilling. If the projections 43' and 43 are representative of cutting tools, they may be utilized to automatically cut a channel in a sheet, plate, casting or other form of metal concentric with the hole 46. The tool portion 42 may be integrally formed of the same material comprising the drill portion 12 or may comprise a separate unit as illustrated. Cutting portions 43 may be integral with 42 or removable therefrom.

The technique of providing hardened cutting edges of at least a portion of a tool by flame spraying ultra-hard materials such as tungsten carbide, boron nitride, aluminum oxide or the like as described for the embodiment of FIG. 3 may also be applied to certain of the other hereinabove described structures such as any of the cutting portions or edges illustrated in FIGS. 3, 5, 6, and 7 as well as to the cutting edges of the drill of the embodiments. For example, the drill-point 12' or cutting edges thereof may be defined by a flame sprayed material as described wherein final grinding or dressing of the cutting edge is effected after said hard material has been flame coated at the end of the drill. In another form, the entire tool may be coated with a hard, flame sprayed material after it has been machined to shape, whereafter dressing or grinding of the cutting edges may be effected by automatic means.

In FIG. 7' upwardly beyond the drill portion 52 is shown a second tool 54 having teeth 55 and disposed in a slotted hole 53 provided along the shank 51. The tool portion 54 is operative to further shape the hole drilled by the drill portion 52 such as to provide a slot therein to serve as a retaining means for a key or guide when a further device is assembled with the work and protrudes into the hole drilled by portion 52 of the tool. The toothed tool portion 54 may define, for example, teeth of a device such as a broach operative to cut the hole and slot same after the tool 50 has completed its drilling operation and has been stopped with the teeth 55 aligned with that portion of the hole to be slotted thereby. Upon predeterminedly prepositioning the teeth 55 of the broach or slotting portion 54 with the work, the tool 50 is thereafter longitudinally moved without rotation in a manner to cause the cutting edges of the teeth 55 to cut a slotted hole in the wall of the hole in the workpiece provided by the drill portion 52. The automatic control means described hereafter may be utilized for controlling rotation of the tool 50 and prepositioning same with the teeth of portion 54 predeterminedly aligned with the hole in the workpiece and thereafter advanced into said hole in a single pass or advanced and retracted a plurality of times in simulating the operation of a conventional broach to provide a channel or slot in said hole of predetermined depth and dimension for holding a key or other device associated with a shaft, pin or fastener inserted into said workpiece hole.

The tool portion 54 may be welded, brazed or otherwise secured in the slotted hole 53 which extends longitudinally along the shank 51 upwardly beyond the drill portion 52. In FIG. 7' a small set screw 56 is shown extending through and recessed in a counter bored hole 57 which extends radially through the shank 51 to the slotted hole 53. The set screw threadably engages a similarly threaded hole in the rear face of the base member 54 and, upon tightening, tensionally draws said member into the slotted hole 53 in the shank 51 to securely hold same in place.

In another form of the embodiment illustrated in FIG. 7', it is noted that the teeth 55 may be formed of the same material of which shank 51 is formed thereby eliminating the need to assemble a plurality of components. The shank 51, including the drill portion 52 and teeth 55 which extend longitudinally along a predetermined portion of the upper shank, may be made of tool steel or other suitable hard metal composition or a ceramic material of suitable hardness such as tungsten carbide, boron nitride, titanium carbide or the like. It may also be made of metal with the cutting portions thereof flame sprayed or otherwise coated with a hard material as hereinafter described. It is also noted that the structure illustrated in FIG. 7' may be modified as hereinbefore described whereby the toothed tool portion 54 or broach may be provided along the shank of a tap or a combination drill and tap at a location such that it may be used to cut a slotted channel in the wall of a hole which has previously been tapped thereby or otherwise machine said hole.

The hereinbefore described multiple purpose combination drilling devices are preferably associated with special tooling and power means which is operatively to rotate the tool at a first speed as it is predeterminedly advanced so as to permit the drill to first drill a hole partially or completely through the work, and to thereafter vary in its operative characteristics in one or more operational modes thereof to perform one or more of the described operatins of dimpling, countersinking, counterboring, thread tapping, punching, deburring or other suitable operations following or effected concurrently with drilling. Apparatus 59 for utilizing one or more of the devices of FIGS. 1 to 7 is shown in FIG. 8 as retaining a multiple purpose tool 60 which represents any of the hereinbefore described tools and includes drill portion 60a and a second portion 60b operative to perform one or more of the described secondary operations following and/or concurrently with drilling.

The tool 60 is held in a holder such as a chuck 61 which is rotatable on a tool head 62 extending from a frame or support 62' for said tool head. The support 62' includes slide bearing means 62" along which head 62 is movable parllel to the longitudinal axis of the tool 60 for entering or abutting the workpiece W. The holder 61 and tool 60 are rotated by a reversible servo-motor 68 the output shaft 72 of which is operatively connected to rotate the head 62 through gear means 72' or any suitable coupling means. Both the servo 68 and gear means 72' are operatively mounted to move longitudinally with the mount 62 and the longitudinally movable components are predeterminately advanced and retracted by a second servo device 63 which is preferably secured to the support 62' or the frame of the machine supporting 62'. The servo device 63 may comprise any suitable lineal actuator mechanism which is signal controllable in speed, direction and degree of movement and may be powered by such devices as a hydraulic or pneumatic cylinder, solenoid or electric motor which may be controllably operative to position (i.e. advance and retract) head 62 a predetermined degree. The head 62 is shown coupled to the output shaft 64 of servo 63.

Servo device 63 is provided with a forward drive control 65, a reverse drive control 66 and a speed control 67. The forward and reverse drive controls 65 and 66 are operative in response to signals passed thereto from an automatic master controller 73 which also controls the tool rotating servo 68 and other auxiliary equipment to be described in a cycle operative to effect a predetermined operation on a workpiece such as hereinbefore described. The master controller 73 may comprise a multicircuit, recycle timer operative to generate signals of predetermined time durations in a sequenced order to control or power the various servos of the system and determine the speed of operation of at least certain of said servos. Said master controller 73 may also comprise more complex types of sequential control devices or a control computer such as an analog or digital computer employing recorded command signals operative to predetermine the speed and degree of operations of the various servos by open loop control or by utilizing feedback signals derived by measuring the actual longitudinal displacement or rotation of the tool 60 or its rotational velocity and bucking respective of said signals against respective command signals generated by the controller 73, in respective devices such as summing amplifiers. Such a summing amplifier control arrangement is shown in FIG. 9 wherein a command signal generating device 73' such as a magnetic record playback device, generates an analog signal on one output 73" thereof which signal is passed to one input of a summing amplifier 73a having an output 73a' connected to the control input of the servomotor, such as 63, to be controlled thereby. A sensing device 73d, such as a selsyn generator, response potentiometer or other signal generating unit, senses the position of the tool being controlled or the rotation of the motor 63 driving same and generates an utput signal which varies in proportion to the movement of the device sensed thereby and is passed to a sum-amplifier 73a. The latter controls the operation of the servo-motor 63 to predeterminedly machine or preposition the tool with respect to the workpiece.

Other features of the apparatus of FIG. 8 include a conveyor 83 driven by a motor 82 which is also shown controlled in its operation by master controller 73 in a manner to position work W with respect to the tool apparatus so as to permit the performance of any of the described multiple operations thereon. Notation 76 refers to a sensing device such as a limit switch or photoelectric cell and light source or other device which is operative to sense the presence of the leading edge of the work W or a work holder to which said work is secured as it is moved along conveyor 83 and to generate a control signal upon sensing said work for initiating a cycle of controlled operation. An amplifier 77 connected to sensor 76 generates a signal on its output 78 upon activation of the sensor which signal is passed to activate the start-cycle input 75 of the controller 73. The multi-circuit timer or controller 73 thereafter sequentially predeterminately controls the various motors of the apparatus to predeterminedly locate and clamp the work W and perform operations as described thereon, release the work and control operation of the conveyor motor 82. Notation 79 refers to an engaging or clamping mechanism operated by one or more motors or solenoids controlled by signals generated by cycle controller 73 for actuating a first clamp 79' to clamp the work W or its holding fixture in predetermined position with respect to the tool and/or actuate a second device 79" for engaging the tool 60 or its drive means to prevent rotation of same, if necessary, during that portion of the cycle in which the tool operates axially without rotation against the work. Advance control 80 for the servo operating work clamping device 79' is activated by the output of sensor 76 so as to engage the work whereby it is predeterminately aligned with tool 60. A signal generated by cycle controller 73 after the tool 60 has completed its operations on the work and has retracted to clear same, is passed to the retract-input 81 of the work clamping device servo 79.

Notation 84 refers to a servo-motor or bi-stable solenoid having an output shaft 85 operative, when advanced, to engage the shaft 72 of the tool rotating motor 68 when an input 86 receives a signal from the computer cycle controller 73 for performing either or both the functions of predeterminately aligning the portion 60b of the tool 60 which performs the secondary operation on the work with respect to the work and/or preventing rotation of the tool 60 during its longitudinal, non-rotational operation on the work. Activation of a second control input 86 by a signal generated by computer or master controller 73 results in retraction of shaft 85 to permit the tool to rotate thereafter to perform a further operation on the work or to operate on the next workpiece positioned in alignment therewith. All or any number of the described servos may be predeterminately controlled during a cycle of operation by feedback means as described in FIG. 9 which senses such variables as the degree of longitudinal travel or position of the tool, its rotational speed or angular position and predeterminedly adjusts or positions the tool with respect to the work prior to the next operation or portion of the machining cycle to be performed.

In a typical cycle of operation, a signal generated by cycle controller or computer 73 is passed to forward control input 65 of motor 63 after the tool rotating motor 68 has been started to rotate in the proper direction by activation of either its clockwise rotational control input 69 or its counterclockwise rotational control input 70 a sufficient time in advance thereof to permit motor 68 to accelerate to its desired operating speed. In an open loop mode of control, predetermined timing of the signals generated by controller 73 is effective in predeterminately controlling the various servo motors and devices described to perform the desired control of degree and speed of rotary motion and advancement of the tool in the desired sequence, the clamping and unclamping of the workpiece or its holding fixture and the operation of various auxiliary devices (not shown) such as cutting liquid flow pumps to flow cutting liquid to the tool, air ejection and/or brushing means to clean the work, inspection device operation, etc. In closed loop control, the cycle controller 73 may be operative to generate analog or digital signals such as reproductions of recordings thereof on cards, tape, discs or drums forming part of said controller and either pass same to individual closed loop controllers such as shown in FIG. 9 or utilize same in such control means provided in the controller 73.

In operation of the apparatus of FIG. 8 employing a drill and punch of the type illustrated in FIG. 1, motors 63 and 68 are first operated under the control of controller 73 to cause the drill portion 60a of tool 60 to drill a hole thru the work piece or sheet. Thereafter, unless the work is to be dimpled or deformed about the hole so drilled by spinning the upper portion 60b of the tool thereagainst, the stop control 71 of motor 68 is activated by a signal from controller 73 and the controls 65–67 of motor 63 are activated by signals from controller 73 in a manner to advance and retract the tool in one or a plurality of strokes to further shape the work by pressing, spinning, cutting or otherwise operating on same. Finally, computer or controller 73 generates signals on the lines to the stop and retract control inputs 66 and 67 of lineal motor or actuator 63 to retract the tool from the work permitting repositioning of the work and/or its removal from the vicinity of the tool. A similar operational mode may be employed to operate the apparatus when employing a drill and slotting tool of the type illustrated in FIG. 7' which may be operative to machine the wall of the drilled hole in a single stroke or a plurality of strokes effected by intermittent activation of controls 65 to 67 of lineal motor actuator 63.

By providing an easily variable multi-channel cycle controller such as a programmer or computer utilizing signals recorded on cards, tape, a drum or disc, it is seen that an infinite number of operations may be performed on various types of work in process utilizing any of the tools hereinbefore described held by the chucking or clamping means 61 of the apparatus. Thus the machine 59 of FIG. 8 is very versatile in its operation and may be used to perform many different operations on work manually or automatically positioned relative thereto as described. The operations may be singular or plural in scope as described and may be performed automatically in minimum time without the delays inherent in conventionally operated machinery performing drilling and tapping, drilling and counterboring or countersinking, drilling and dimpling, drilling and slotting, etc. which machinery has inherent delays resulting from withdrawing the drill from the hole and thereafter rehandling and repositioning the work or tool to effect the secondary operation thereafter. In addition to increasing productivity, the apparatus hereinbefore described is substantially simpler in structure than conventional ganged multiple machines operative to perform similar operations and is substantially more versatile. Changeover from one plural machine operation to another merely requires changing the set-up of the multi-cycle timer or, if a computer, the record member from which command control signals are derived and, in certain instances, changing the tool itself to another of those illustrated in FIGS. 1 to 7' for performing the proper combined operations on the work. Automatic tool changing apparatus of known design may also be employed controlled by a signal generated by the master cycle controller 73 to automate tool changing.

As FIGS. 8 and 9 are schematic block diagrams, it is assumed that the correct power supplies are provided on the correct sides of all motors, solenoids, sensors, relays, amplifiers, etc.

I claim:

1. A tool comprising a plurality of operating portions each adapted to perform a selected operation on a workpiece, said operating portions being aligned on a common axis to provide a unitary structure, means at one end of said structure to manipulate said tool and means at the other end to initiate an operation on a workpiece, the tool being movable through said workpiece to apply said operating portions thereto one after another, and means operable to predeterminately control both the rotary and longitudinal movement of said tool and vary same as each of said operating portions engage said workpiece in a cycle including controlled removal of said tool from said workpiece.

2. The tool defined in claim 1, said means to initiate an operation on a workpiece comprising a drill, and a tap disposed axially with said drill for tapping threads in the hole machined by said drill during a single pass through a workpiece said control means being operative to vary the rotational speed of said tool prior to tapping a hole bored by said drill and to predeterminately change the lineal movement of said tool once drilling has been completed before tapping is commenced.

3. The tool defined in claim 2 including reaming means disposed beyond said tap for reaming the outer portion of the wall of the hole machined by said drill and tap during a single pass through a workpiece.

4. The tool defined in claim 1, a first of said operating portions comprising a drill, a second operating portion comprising a forming tool portion having a frusto-conical extension of the upper shank of said drill adapted for dimpling a sheet by longitudinal movement of said tool after a hole has been machined therein by said drill.

5. The tool defined in claim 1, a first of said operating portions comprising a drill, a second of said operating portions comprising a shaping tool having a plurality of cutting teeth disposed in a line longitudinally along the shank of said drill and arranged in a progression of teeth of increasing diameters for machining a slot in the wall of the hole machined by said drill during a single pass of the tool through the work.

6. The tool defined in claim 5 said cutting teeth being formed of the material of the shank of said drill.

7. The tool defined in claim 1, a first of said operating portions comprising a drill, a second of said operating portions comprising a shaping tool including an insert assembled in a slotted hole in the wall of the shank of said drill.

8. The tool defined in claim 1 and including power means for rotating said tool and power means for longitudinally moving said tool, and a program control means coupled to control said power means to control the rotational and longitudinal movement of said tool.

9. A tool comprising a plurality of operating portions each adapted to perform a selected operation on a workpiece, said operating portions being aligned with respect to a common axis and operative to sequentially engage said workpiece for performing respective operations thereon, first variable speed power means for rotating said tool, second power means for longitudinally moving said tool towards and away from said workpiece, one of said operating portions being operative to engage and machine said workpiece during a first stroke of said tool while the tool rotates, the other operating portion being operative to machine said workpiece during a second stroke of said tool while the tool rotates at a second speed, and program control means operatively connected to said first and second power means to vary the operations of both for predeterminedly varying the rotational speed in accordance with the longitudinal movement of said tool.

10. A tool comprising a plurality of operating portions each adapted to perform a selected operation on a workpiece said operating portions being aligned with respect to a common axis and operative to sequentially engage said workpiece for performing respective operations thereon, first variable speed power means for rotating said tool, second power means for longitudinally moving said tool towards and away from said workpiece, one of said operating portions being operative to engage and machine said workpiece during a first stroke of said tool while the tool rotates, the other operating portion being operative to form said workpiece by deforming same during movement of said tool against said workpiece, and sequential control means operatively connected to said first and second power means to first rotate said tool while moving it towards said workpiece and to thereafter deform said workpiece by bringing the other operating portion of said tool into engagement with said workpiece.

11. Apparatus as defined in claim 1 including means for moving work into and out of the realm of said tool, power means for said moving means, controls for said power means, and master control means for predeterminately controlling the rotary and longitudinal movement of said tool and said power means for said work moving means.

12. Apparatus in accordance with claim 11 including means for sensing the presence of a workpiece, said sensing means being operatively connected to said master control means for initiating operation of same each time a workpiece is sensed, and work restraining means operative upon activation of said sensing means for predeterminedly holding a workpiece aligned with said tool.

References Cited

UNITED STATES PATENTS

| | | | |
|---|---|---|---|
| 93,824 | 8/1869 | Humphreys | 10—140 |
| 188,405 | 3/1877 | Peterson et al. | 10—140 |
| 1,271,299 | 7/1918 | Fish | 29—95 |
| 1,273,249 | 7/1918 | Lurker | 29—95 |
| 1,643,679 | 9/1927 | Roderick | 77—65 |
| 1,813,040 | 7/1931 | Ferris. | |
| 1,942,145 | 2/1934 | Knight | 83—682 |
| 2,188,110 | 5/1938 | Rosenberg | 83—682 |
| 2,369,120 | 2/1945 | Ferries | 77—65 |
| 2,813,280 | 11/1957 | Huffman | 10—128 |
| 2,896,587 | 7/1959 | Hause. | |
| 2,901,927 | 9/1959 | Morgan | 318—39 X |
| 2,965,059 | 12/1960 | Terwilliger | 72—464 |
| 3,003,165 | 10/1961 | Charlat | 10—128 |
| 3,059,688 | 10/1962 | Colbert | 72—7 |
| 3,124,817 | 3/1964 | Mosier | 10—128 |
| 3,176,090 | 3/1965 | Cox | 72—7 |
| 3,191,205 | 6/1965 | Gilbert | 10—139 |
| 3,192,761 | 7/1965 | Hoskins | 72—464 |

ANDREW R. JUHASZ, *Primary Examiner.*

FRANCIS S. HUSAR, *Examiner.*